(12) United States Patent
Kim et al.

(10) Patent No.: US 11,930,348 B2
(45) Date of Patent: Mar. 12, 2024

(54) COMPUTER SYSTEM FOR REALIZING CUSTOMIZED BEING-THERE IN ASSOCIATION WITH AUDIO AND METHOD THEREOF

(71) Applicants: NAVER Corporation, Seongnam-si (KR); Gaudio Lab, Inc., Seoul (KR)

(72) Inventors: Dae Hwang Kim, Seongnam-si (KR); Jung Sik Kim, Seongnam-si (KR); Dong Hwan Kim, Seongnam-si (KR); Ted Lee, Seoul (KR); Jeonghun Seo, Seoul (KR); Hyeonsu Seo, Seoul (KR)

(73) Assignees: NAVER CORPORATION, Gyeonggi-do (KR); GAUDIO LAB, INC., Seoul (KR)

( * ) Notice: Subject to any disclaimer, the term of this patent is extended or adjusted under 35 U.S.C. 154(b) by 20 days.

(21) Appl. No.: 17/534,804

(22) Filed: Nov. 24, 2021

(65) Prior Publication Data

US 2022/0167103 A1 May 26, 2022

(30) Foreign Application Priority Data

Nov. 24, 2020 (KR) .................. 10-2020-0158485
Jun. 4, 2021 (KR) .................. 10-2021-0072522

(51) Int. Cl.
*H04S 7/00* (2006.01)
*G06F 3/16* (2006.01)
(Continued)

(52) U.S. Cl.
CPC ............... *H04S 7/30* (2013.01); *G06F 3/165* (2013.01); *G06F 16/687* (2019.01); *H04L 65/61* (2022.05);
(Continued)

(58) Field of Classification Search
CPC ........ H04S 7/30; H04S 3/008; H04S 2400/01; H04S 2400/11; H04S 2400/15; G06F 16/687; G06F 3/165; H04L 65/61
See application file for complete search history.

(56) References Cited

U.S. PATENT DOCUMENTS 9,654,895 B2    5/2017  Breebaart et al.
2014/0133683 A1*  5/2014  Robinson ................ H04S 7/308
                                                        381/303
(Continued)

FOREIGN PATENT DOCUMENTS

JP          A 04-15693 A      1/1992
JP          2005-150993 A     6/2005
(Continued)

OTHER PUBLICATIONS

Gunnarsson, "Creating the Perfect Sound System with 3D Sound Reproduction", Jun. 27, 2017 (Year: 2017).*
(Continued)

*Primary Examiner* — David L Ton
(74) *Attorney, Agent, or Firm* — Harness, Dickey & Pierce, P.L.C.

(57) ABSTRACT

A method by a computer system including generating audio files based on respective audio signals, the audio signals having been respectively generated from a plurality of objects at a venue, generating metadata including spatial features at the venue that are respectively set for the objects, and transmitting the audio files and the metadata for the objects to a first electronic device to cause the first electronic device to realize a being-there at the venue by rendering the audio files based on the spatial features in the metadata may be provided.

18 Claims, 13 Drawing Sheets

(51) Int. Cl.
*G06F 16/687* (2019.01)
*H04L 65/61* (2022.01)
*H04S 3/00* (2006.01)

(52) U.S. Cl.
CPC .......... *H04S 3/008* (2013.01); *H04S 2400/01* (2013.01); *H04S 2400/11* (2013.01); *H04S 2400/15* (2013.01)

(56) References Cited

U.S. PATENT DOCUMENTS

| | | | | |
|---|---|---|---|---|
| 2016/0142846 | A1* | 5/2016 | Herre | H04S 3/02 381/23 |
| 2016/0192105 | A1 | 6/2016 | Breebaart et al. | |
| 2020/0053457 | A1* | 2/2020 | Vilkamo | H04S 3/00 |
| 2020/0275230 | A1* | 8/2020 | Laaksonen | G10L 19/008 |
| 2021/0029480 | A1* | 1/2021 | Mate | G10L 19/008 |
| 2022/0116726 | A1* | 4/2022 | Alur | H04R 5/02 |
| 2022/0392457 | A1* | 12/2022 | Kim | G10L 19/00 |

FOREIGN PATENT DOCUMENTS

| | | |
|---|---|---|
| JP | 2014-526168 A | 10/2014 |
| JP | 2019-535216 A | 12/2019 |
| JP | 2022-83443 A | 6/2022 |
| JP | 2022-83445 A | 6/2022 |
| KR | 10-2012-0062758 A | 6/2012 |
| KR | 10-1717928 B1 | 3/2017 |
| KR | 10-2019-0123300 A | 10/2019 |
| KR | 10-2019-0134854 A | 12/2019 |
| KR | 10-2020-0040745 A | 4/2020 |
| WO | WO-2015/182492 A1 | 12/2015 |
| WO | WO-2019/069710 A1 | 4/2019 |
| WO | WO-2020/010064 A1 | 1/2020 |

OTHER PUBLICATIONS

Korean Office Action dated Jun. 29, 2022 issued in corresponding Korean Patent Application No. 10-2021-0072522.
Japanese Office Action dated Dec. 6, 2022 issued in Japanese Patent Application No. 2021-190470.
Japanese Office Action dated Jun. 27, 2023 issued in Japanese Patent Application No. 2021-190470.
Korean Office Action dated Jul. 19, 2022 issued in Korean Patent Application No. 10-2021-0072524.
Japanese Office Action dated Dec. 6, 2022 issued in Japanese Patent Application No. 2021-190472.
Japanese Office Action dated Jun. 27, 2023 issued in corresponding Japanese Patent Application No. 2021-190472.
U.S. Office Action dated Jun. 15, 2023 issued in co-pending U.S. Appl. No. 17/534,823.
Korean Office Action dated Jun. 29, 2022 issued in corresponding Korean Patent Application No. 10-2021-0072523.
Japanese Office Action dated Dec. 6, 2022 issued in Japanese Patent Application No. 2021-190471.
U.S. Notice of Allowance dated Oct. 4, 2023 issued in co-pending U.S. Appl. No. 17/534,823.
U.S. Office Action dated Jun. 27, 2023 issued in co-pending U.S. Appl. No. 17/534,919.
S. Hiconmez, H. T. Sencar and I. Avcibas, Audio codec identification through payload sampling,"" 2011 IEEE International Workshop on Information Forensics and Security, Iguacu Falls, Brazil, 2011, pp. 1-6, doi: 10.1109/WIFS.2011.6123128. (Year: 2011).
U.S. Notice of Allowance dated Nov. 15, 2023 issued in co-pending U.S. Appl. No. 17/534,919.

* cited by examiner

COMPUTER SYSTEM FOR REALIZING CUSTOMIZED BEING-THERE IN ASSOCIATION WITH AUDIO AND METHOD THEREOF

CROSS-REFERENCE TO RELATED APPLICATION(S)

This U.S. non-provisional application and claims the benefit of priority under 35 U.S.C. § 119 to Korean Patent Application Nos. 10-2020-0158485 filed on Nov. 24, 2020, and 10-2021-0072522 filed on Jun. 4, 2021, the entire contents each of which are incorporated herein by reference in their entirety.

BACKGROUND

Technical Field

One or more example embodiments relate to computer systems for realizing a user-customized being-there in association with audio and/or methods thereof.

Related Art

In general, a content providing server provides audio content in a completed form for a user. Here, the audio content in the completed form, that is, the completed audio content is implemented by mixing a plurality of audio signals, and, for example, represents stereo audio content. Through this, an electronic device of a user receives the completed audio content and simply plays back the received audio content. That is, the user only listens to sound of a predetermined configuration based on the completed audio content.

SUMMARY

Some example embodiments provide computer systems for realizing a user-customized being-there in association with audio and/or methods thereof.

According to an aspect of at least one example embodiment, there is provided a method by a computer system includes generating audio files based on respective audio signals, the audio signals having been respectively generated from a plurality of objects at a venue, generating metadata including spatial features at the venue that are respectfully set for the objects, and transmitting the audio files and the metadata for the objects to a first electronic device to cause the first electronic device to realize a being-there at the venue by rendering the audio files based on the spatial features in the metadata.

According to an aspect of at least one example embodiment, there is provided a non-transitory computer-readable record medium storing a program, which, when executed by at least one processor included in a computer system, causes the computer system to perform the aforementioned methods.

According to an aspect of at least one example embodiment, a computer system includes a first electronic device included in the computer system and configured to generate audio files based on respective audio signals, the audio signals respectively generated from a plurality of objects at a venue, and generate metadata including spatial features at the venue that are respectively set for the objects, and a server configured to transmit the audio files and the metadata for the objects to a second electronic device to cause the second electronic device to realize a being-there at the venue by rendering the audio files based on the spatial features in the metadata.

According to some example embodiments, it is possible to propose stereophonic sound implementation technology for realizing a user-customized being-there in association with audio. Here, a computer system may generate audio files for a plurality of objects at a specific venue, respectively. The computer system may generate metadata including spatial features at the venue for the objects or may change audio files. Here, the computer system may generate the spatial features for the objects, respectively, based on settings of a creator. Through this, an electronic device may reproduce user-customized audio content instead of simply playing back completed audio content. That is, the electronic device may implement stereophonic sound by rendering the audio files based on the spatial features in the metadata. That is, the electronic device may realize the user-customized being-there in association with audio by using the audio files and the metadata as materials. Therefore, a user of the electronic device may feel the user-customized being-there, as if the user directly listens to audio signals generated from specific objects at a specific venue.

Further areas of applicability will become apparent from the description provided herein. The description and specific examples in this summary are intended for purposes of illustration only and are not intended to limit the scope of the present disclosure.

DETAILED DESCRIPTION

Figure 1:
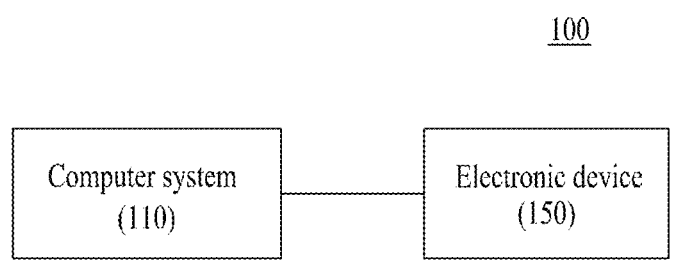
FIG. 1 is a diagram illustrating an example of a content providing system according to at least one example embodiment.

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

In the following, the term "object" may represent a device or a person that generates an audio signal. For example, the object may include one of a musical instrument, an instrument player, a vocalist, a talker, a speaker that generates accompaniment or sound effect, and a background that generates ambience. The term "audio file" may represent audio data for an audio signal generated from each object.

In the following, the term "metadata" may represent information for describing a property of an audio scene related to at least one audio file. Here, the audio scene may include at least one object and the metadata may include at least one spatial feature of the object. For example, the metadata may include at least one of position information about at least one object, group information representing a position combination of at least two objects, and environment information about a venue in which at least one object is disposed. The venue may include, for example, a studio, a concert hall, a street, and a stadium.

Figure 2:
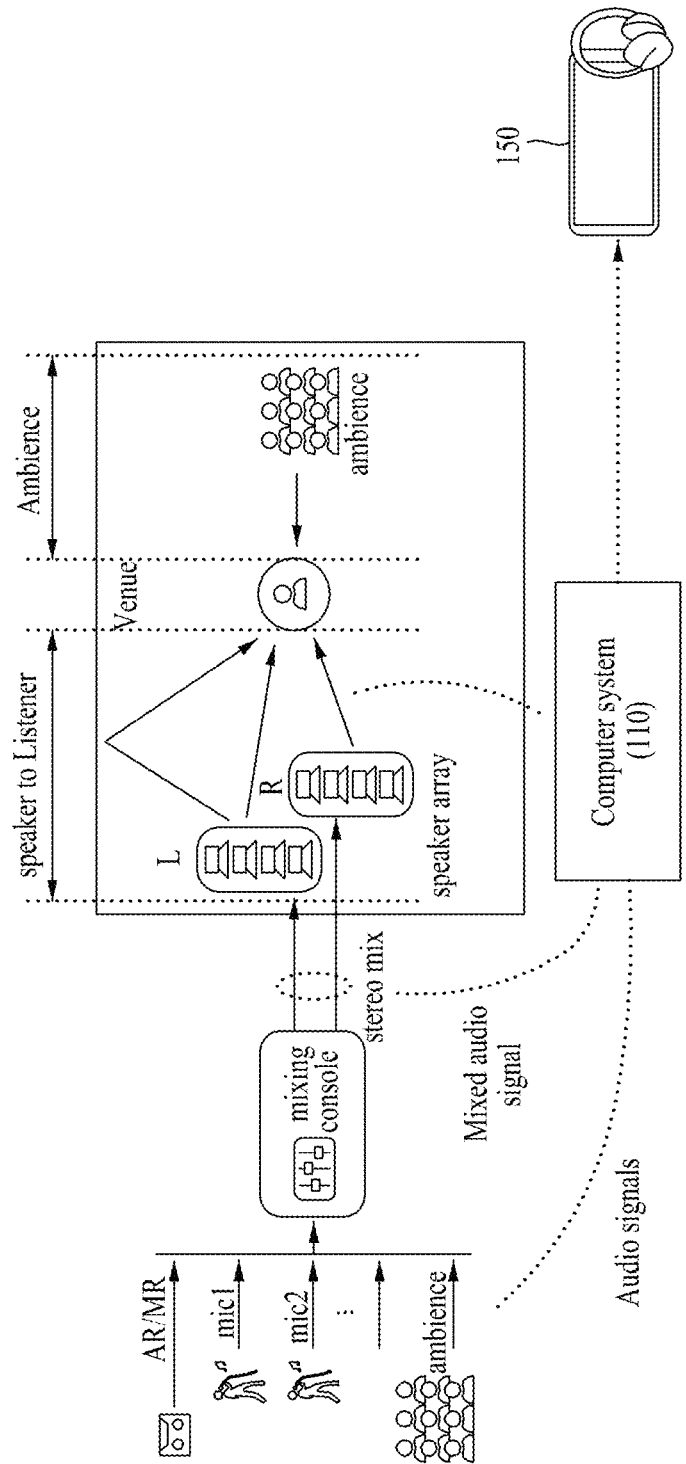
FIG. 2 illustrates an example of describing a function of a content providing system according to at least one example embodiment.

FIG. 1 is a diagram illustrating a content providing system 100 according to at least one example embodiment, and FIG. 2 illustrates an example of describing a function of the content providing system 100 according to at least one example embodiment.

Referring to FIG. 1, the content providing system 100 may include a computer system 110 and an electronic device 150. For example, the electronic device 150 may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a home appliance, a medical device, and a robot.

The computer system 110 may provide content for a user. Here, the content may refer to various types of contents, for example, audio content, video content, virtual reality (VR) content, augmented reality (AR) content, and extended reality (XR) content. The content may include at least one of plain content and immersive content. The plain content may refer to completed content and the immersive content may refer to user-customized content. Hereinafter, description is made using the audio content as an example.

Plain audio content may be implemented in a stereo form by mixing audio signals generated from a plurality of objects. For example, referring to FIG. 2, the computer system 110 may obtain an audio signal in which audio signals of a venue are mixed and may generate the plain audio content based on the audio signal. Meanwhile, immersive audio content may include audio files for the audio signals generated from the plurality of objects at the venue and metadata related thereto. Here, in the immersive audio content, the audio files and the metadata related thereto may be individually present. For example, referring to FIG. 2, the computer system 110 may obtain audio files for a plurality of objects, respectively, and may generate the immersive audio content based on the audio files.

The electronic device 150 may play back content provided from the computer system 110. Here, the content may refer to various types of contents, for example, audio content, video content, VR content, AR content, and XR content. The content may include at least one of plain content and immersive content.

When the immersive audio content is received from the computer system 110, the electronic device 150 may obtain audio files and metadata related thereto from the immersive audio content. The electronic device 150 may render at least one of the audio files based on the metadata. Through this, the electronic device 150 may realize a user-customized being-there in association with audio based on the immersive audio content. Therefore, the user may feel being-there as if the user directly listens to an audio signal generated from a corresponding object at a venue in which at least one object is disposed.

Figure 3:
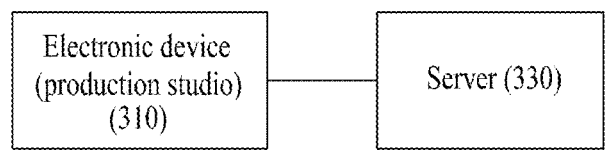
FIG. 3 is a diagram illustrating an example of a configuration of a computer system of FIGS. 1 and 2.
Figure 4A:
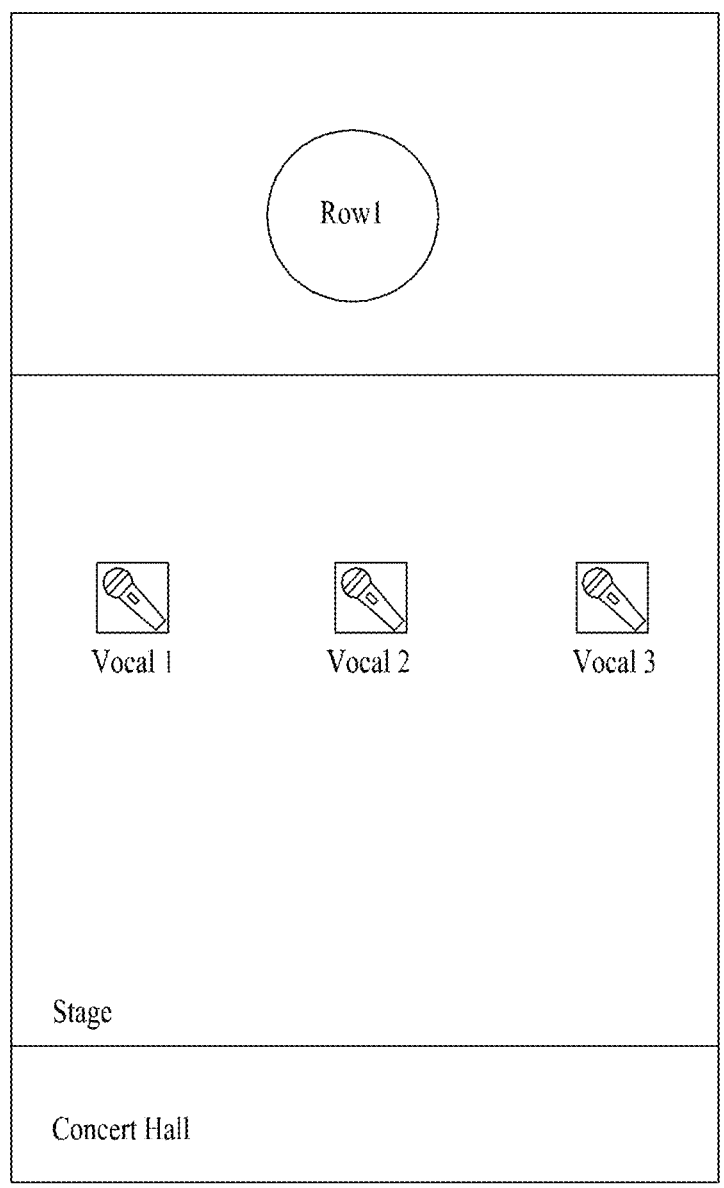
FIGS. 4A and 4B illustrate examples of a graphic interface provided by an electronic device of FIG. 3.
Figure 4B:
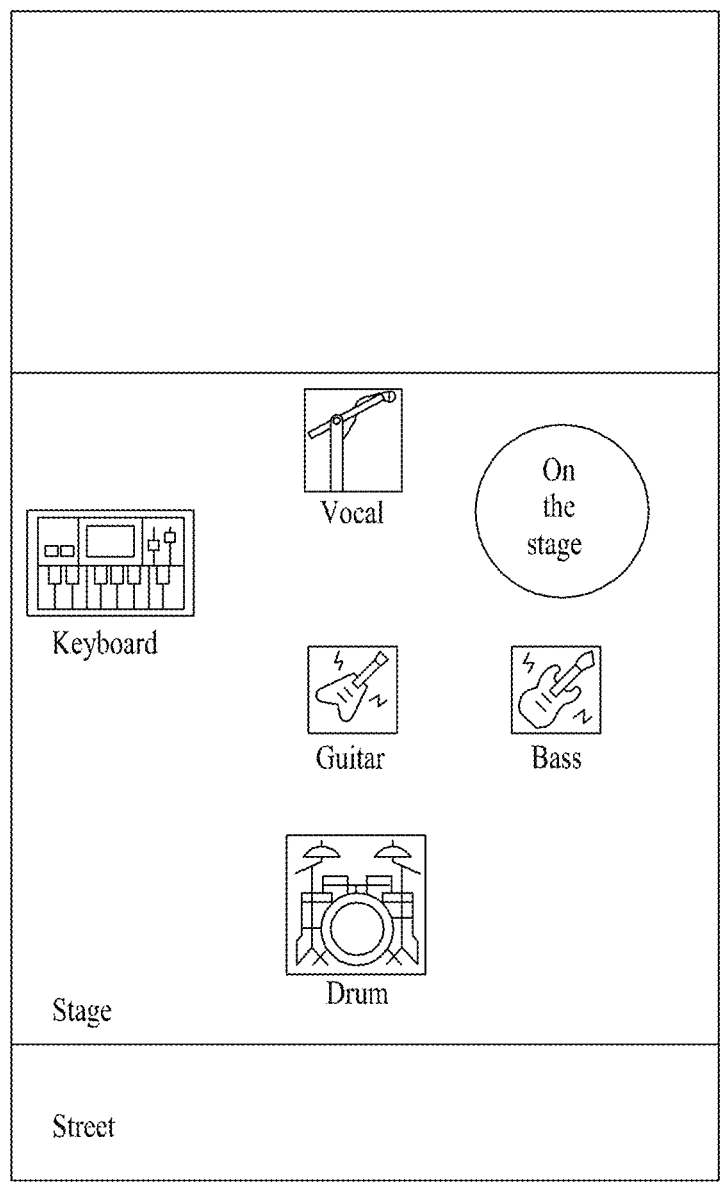
Figure 4C:
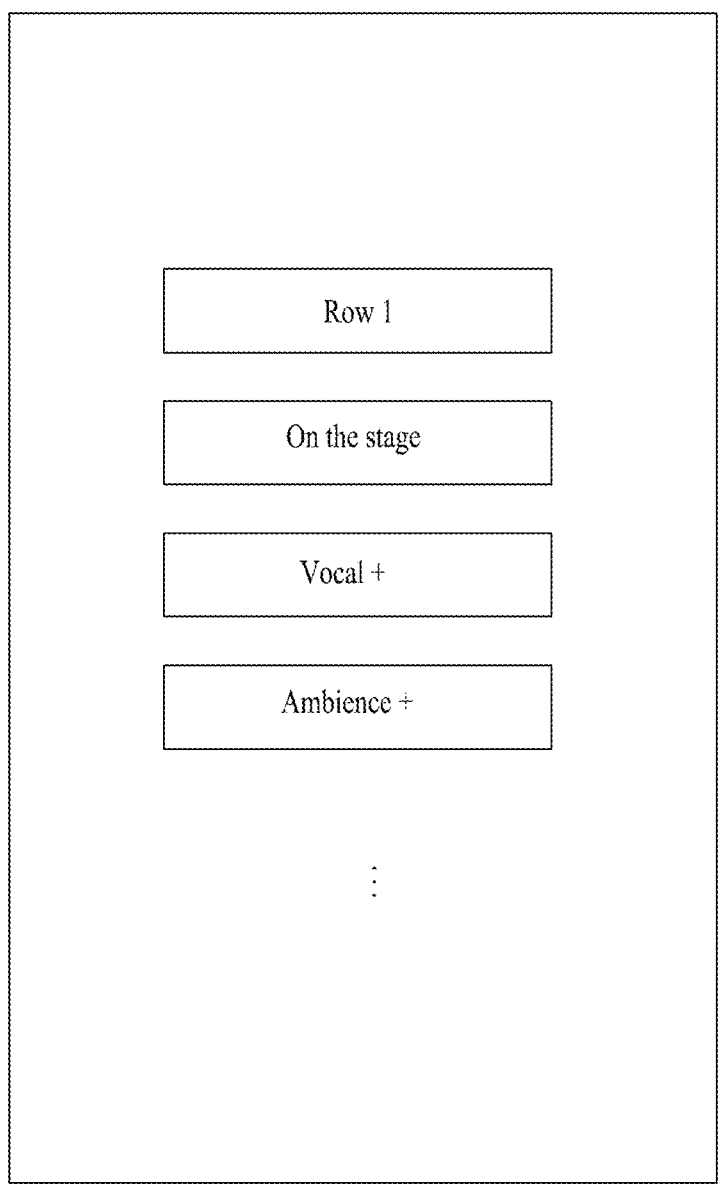
FIG. 4C illustrates an example of a user interface provided by an electronic device of FIGS. 1 and 2.

FIG. 3 is a diagram illustrating an example of a configuration of the computer system 110 of FIGS. 1 and 2. FIGS. 4A and 4B illustrate examples of a graphic interface provided by an electronic device 310 of FIG. 3, and FIG. 4C illustrates an example of a user interface provided by the electronic device 150 of FIGS. 1 and 2.

Referring to FIG. 3, the computer system 110 may include at least one of the electronic device (also, referred to as a production studio) 310 and a server 330. In some example embodiments, at least one of components of the computer system 110 may be omitted and at least one another component may be added. In some example embodiments, at least two components among the components of the computer system 110 may be integrated into a single component. According to an example embodiment, the electronic device 310 and the server 320 may be integrated into a single component. For example, the electronic device 310 may refer to a device equipped with various hardware, for example, an audio console and an audio interface such as Dante, and may include at least one of a smartphone, a mobile phone, a navigation device, a computer, a laptop computer, a digital broadcasting terminal, a PDA, a PMP, a tablet PC, a game console, a wearable device, an IoT device, a home appliance, a medical device, and a robot.

The electronic device 310 may generate audio files for a plurality of objects and metadata related thereto. To this end, the electronic device 310 may obtain audio signals respectively generated from objects, at a specific venue. Here, the electronic device 310 may obtain each audio signal through a microphone directly attached to each object or installed to be adjacent to each object. The electronic device 310 may generate the audio files using the audio signals, respectively. In addition, the electronic device 310 may generate the metadata related to the audio files. To this end, the electronic device 310 may set spatial features at a venue for objects, respectively. Here, the electronic device 310 may set at least one of position information about each object and group information representing a position combination of at least two objects using a direct position of each object or a position of a microphone for each object. Further, the electronic device 310 may recognize a direct position of each object through a camera. Also, the electronic device 310 may set environment information about a venue in which objects are disposed.

For example, referring to FIG. 4A or 4B, the electronic device 310 may set spatial features of objects based on an input of a creator through a graphic interface. Here, the electronic device 310 may directly provide the graphic interface or may provide the graphic interface through another electronic device (not shown) of the creator. The electronic device 310 may select each of objects for a specific venue and may set spatial features, that is, at least one of position information, group information, and environment information in association with the objects. Here, the electronic device 310 may set a position of each object based on the input of the creator and may fine-tune at least one of a position and an audio effect for each object. Here, the audio effect may represent a positional relationship between an object and a listener in a corresponding space. For example, the audio effect may include azimuth, elevation, distance, BES, gain, etc., of a position of an object relative to a position of a listener. Herein, although the position of the object is represented through azimuth, elevation, and distance, a scheme capable of representing the position of the object is not limited to a specific coordinate system. Through this, the electronic device 310 may set a spatial feature of a corresponding object based on a position and an audio effect of the object. For example, referring to FIG. 4A, the electronic device 310 may select each of three vocalists as an object through a graphic interface and may set a spatial feature for metadata accordingly. Here, the electronic device 310 may further select row 1 among audience seats in a concert hall as a virtual position of a user. The electronic device 310 may set the concert hall as a venue. As another example, referring to FIG. 4B, the electronic device 310 may select each of a keyboard, a drum, a guitar, a bass, and a vocalist (vocal) as an object through a graphic interface and may set a spatial feature for metadata accordingly. Here, the electronic device 310 may set a single point in a stage on a street as a virtual position of the user. Also, the electronic device 310 may set the street as a venue.

The electronic device 310 may generate metadata based on spatial features of objects. Here, the electronic device 310 may generate presets (or alternatively, desired sets) selectable by the electronic device 150 by combining the spatial features of the objects. For example, the electronic device 310 may generate presets by combining environment information about a specific venue, position information of specific objects, and audio effects. Here, each of the presets may also be referred to as audio scene information. Here, each of the presets may represent an audio scene when a position of the user corresponds to the center of a stage, an audio scene when the position of the user corresponds to audience seat row 1, an audio scene with an emphasis on vocalists, an audio scene with an emphasis on musical instruments, an audio scene with an emphasis on field sound, an audio scene with a dynamically moving stringed instrument, and the like.

The server 330 may transmit the audio files and the metadata related thereto to the electronic device 150. For example, the server 330 may generate immersive audio content in a desired (or alternatively, predetermined) format based on the audio files and the metadata related thereto. Here, in the immersive audio content, the audio files and the metadata related thereto may be individually present. The server 330 may transmit the immersive audio content to the electronic device 150. Here, the server 330 may be a live streaming server.

Through this, the electronic device 150 may render the audio files based on the metadata. For example, referring to FIG. 4C, the electronic device 150 may select a single preset from among presets based on an input of the user through a user interface (UI). That is, the electronic device 150 may display audio scene information of each of a plurality of presets and may select a single preset from among the presets based on the input of the user. Therefore, the electronic device 150 may render the audio files using the spatial features of the objects based on the selected preset. For example, the electronic device 150 may extract first preset information and second preset information and may perform switching from the first preset information to the second preset information at a point of reducing or minimizing a sound quality distortion by referring to a look-up table including an index of sound quality distortion occurring when switching from the first preset information to the second preset information over time. Here, the look-up table may be generated by at least one of the electronic device 310, the server 330, and the electronic device 150. Through this, the electronic device 150 may realize a user-customized being-there for a corresponding venue.

In some example embodiments, the server 330 may transmit a signal that is pre-rendered in a format playable by the electronic device 150. For example, when the electronic device 150 is incapable of rendering audio files based on metadata, the server 330 may transmit the pre-rendered signal for the electronic device 150. The playable format may include one of a headphone, a stereo speaker, a multichannel speaker, and a sound bar. Referring to FIG. 4C, in the case of providing a function that allows the user to select a preset in real time, pre-rendering may be performed for each preset.

Figure 5:
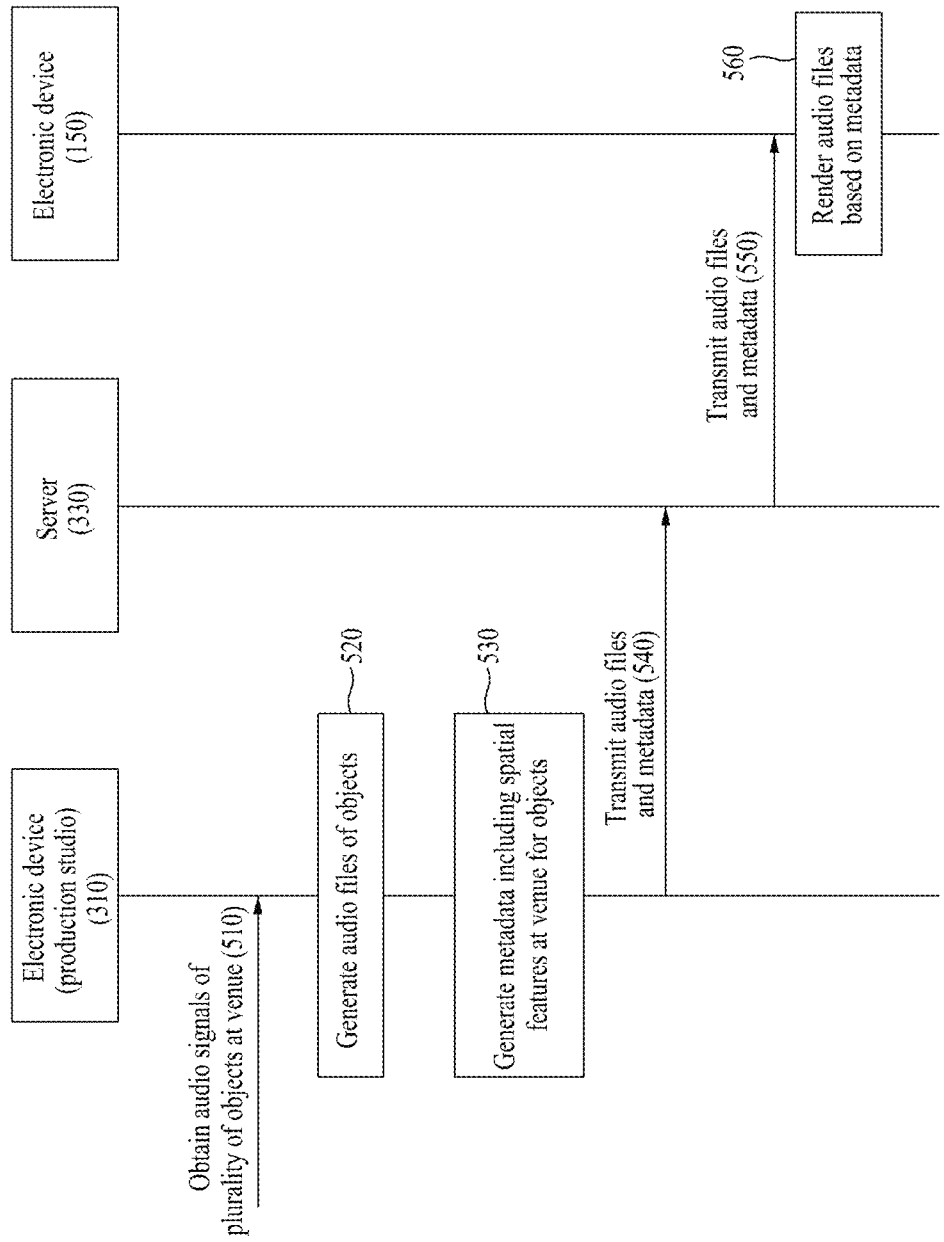
FIG. 5 is a flowchart illustrating a signal flow in a content providing system according to at least one example embodiment.

FIG. 5 is a flowchart illustrating an example of a signal flow in the content providing system 100 according to at least one example embodiment.

Referring to FIG. 5, in operation 510, the electronic device (production studio) 310 may obtain audio signals of a plurality of objects at a specific venue. That is, the electronic device 310 may obtain the audio signals respectively generated from the objects at the venue. Here, the electronic device 310 may obtain each audio signal through a microphone directly attached to each object or installed to be adjacent to each object.

In operation 520, the electronic device 310 may generate audio files of the objects. The electronic device 310 may generate the audio files from the audio signals of the objects, respectively. In operation 530, the electronic device 310 may generate metadata including spatial features at a venue for the objects. Here, the electronic device 310 may set the spatial features at the venue for the objects, respectively. For example, the electronic device 310 may set spatial features of objects based on an input of a creator through a graphic interface. Through this, the electronic device 310 may generate the metadata based on the spatial features of the objects.

In operation 540, the electronic device 310 may transmit the audio files and the metadata to the server 330. Here, the electronic device 310 may transmit the audio files and the metadata by compressing and encoding the same. In operation 550, the server 330 may transmit the audio files and the metadata to the electronic device 150.

In operation 560, the electronic device 150 may render at least one of the audio files based on the metadata. Here, the electronic device 150 may select at least one object from among the objects at the venue based on the metadata. For example, the electronic device 150 may select at least one object from among the objects based on a user input through the user interface. Through this, the electronic device 150 may render an audio file of the selected object based on a spatial feature of the selected object in metadata. In this manner, the electronic device 150 may realize a user-customized being-there for the corresponding venue. Therefore, the user may feel the user-customized being-there as if the user directly listens to an audio signal generated from a corresponding object at the venue in which at least one object is disposed.

Figure 6:
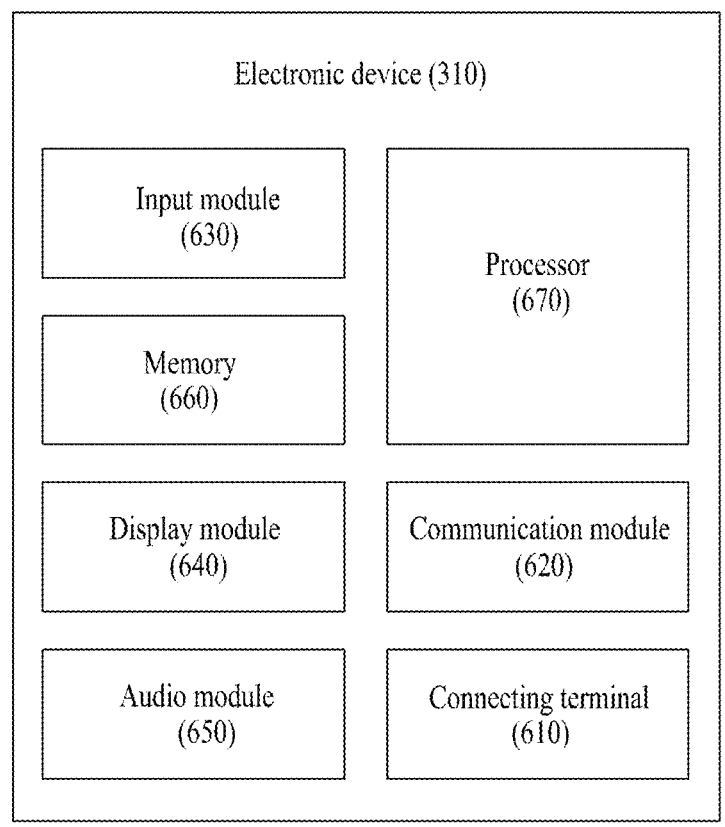
FIG. 6 is a diagram illustrating an example of an internal configuration of an electronic device (a production studio) according to at least one example embodiment.

FIG. 6 is a diagram illustrating an example of an internal configuration of the electronic device 310 according to at least one example embodiment.

Referring to FIG. 6, the electronic device (production studio) 310 may include at least one of a connecting terminal 610, a communication module 620, an input module 630, a display module 640, an audio module 650, a memory 660, and a processor 670. In some example embodiments, at least one of components of the electronic device 310 may be omitted and at least one another component may be added. In some example embodiments, at least two components among components of the electronic device 310 may be implemented as a single integrated circuitry.

The connecting terminal 610 may be physically connected to an external device in the electronic device 310. For example, the electronic device may include another electronic device. To this end, the connecting terminal 610 may include at least one connector. For example, the connector may include at least one of a high-definition multimedia interface (HDMI) connector, a universal serial bus (USB) connector, a secure digital (SD) card connector, and an audio connector.

The communication module 620 may communicate with the external device in the electronic device 310. The communication module 620 may establish a communication channel between the electronic device 310 and the external device and communicate with the external device through the communication channel. For example, the external device may include at least one of the server 330 and the electronic device 150. The communication module 620 may include at least one of a wired communication module and a wireless communication module. The wired communication module may be connected to the external device in a wired manner through the connecting terminal 610 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The input module 630 may input a signal to be used for at least one component of the electronic device 310. The input module 630 may include at least one of an input device configured for the user to directly input a signal to the electronic device 310, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of touch circuitry configured to detect a touch and sensor circuitry configured to measure strength of force occurring due to the touch.

The display module 640 may visually display information. For example, the display module 640 may include at least one of a display, a hologram device, and a projector. For example, the display module 640 may be configured as a touchscreen through assembly to at least one of the sensor circuitry and the touch circuitry of the input module 630.

The audio module 650 may auditorily play back information. For example, the audio module 650 may include at least one of a speaker, a receiver, an earphone, and a headphone.

The memory 660 may store a variety of data used by at least one component of the electronic device 310. For example, the memory 660 may include at least one of a volatile memory and a non-volatile memory. Data may include at least one program and input data or output data related thereto. The program may be stored in the memory 660 as software including at least one instruction. The memory 660 may store a production tool to generate audio files and metadata related thereto.

The processor 670 may control at least one component of the electronic device 310 by executing the program of the memory 660. Through this, the processor 670 may perform data processing or operation. Here, the processor 670 may execute an instruction stored in the memory 660. The processor 670 may generate audio files, respectively, based on audio signals respectively generated from a plurality of objects at a specific venue. The processor 670 may generate metadata including spatial features at the venue that are respectively set for the objects using a production tool. Further, the, processor 670 may transmit the audio files for the objects and the metadata through the communication module 620. Here, the processor 670 may transmit the audio files and the metadata to the server 330 using a first communication protocol, for example, a real time messaging protocol (RTMP).

Figure 7:
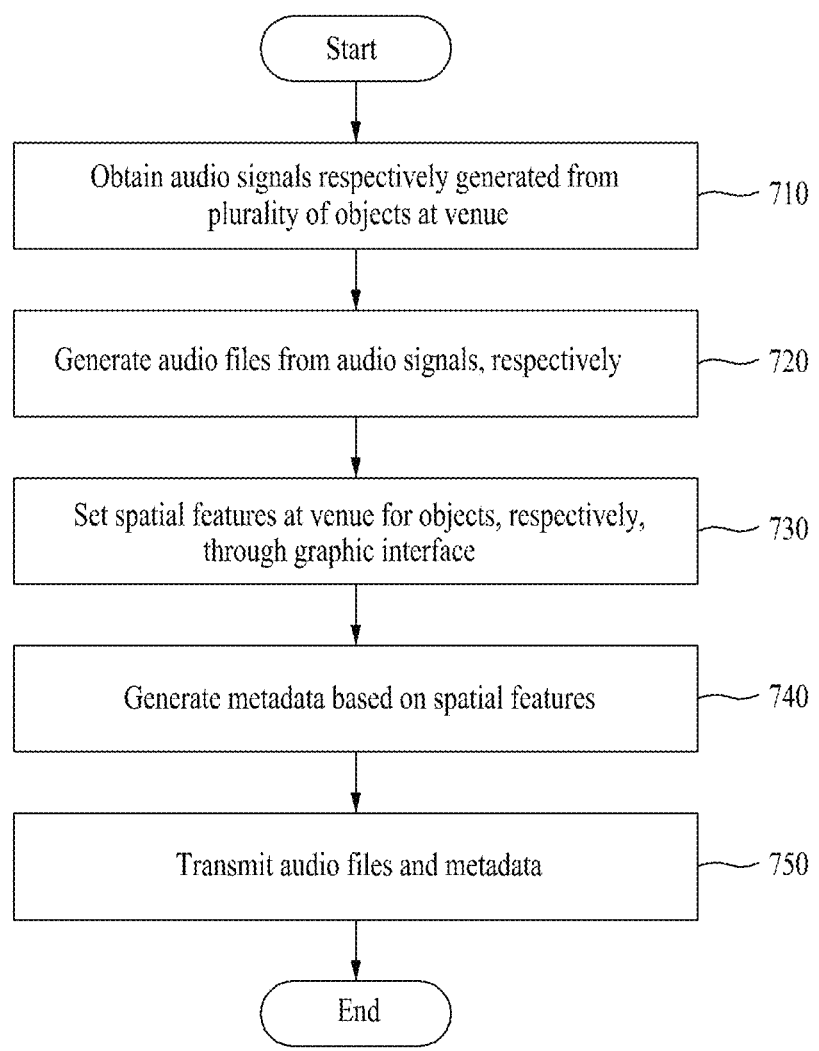
FIG. 7 is a flowchart illustrating an example of an operation procedure of an electronic device according to at least one example embodiment.

FIG. 7 is a flowchart illustrating an example of an operation procedure of the electronic device 310 according to at least one example embodiment.

Referring to FIG. 7, in operation 710, the electronic device 310 may obtain audio signals of a plurality of objects at a specific venue. That is, the processor 670 may obtain the audio signals respectively generated from the objects at the venue. Here, the processor 670 may obtain each audio signal through a microphone directly attached to each object or installed to be adjacent to each object. In operation 720, the electronic device 310 may generate audio files from the audio signals, respectively. The processor 670 may generate the audio files from the audio signals of the objects, respectively.

In operation 730, the electronic device 310 may set spatial features at the venue for the objects, respectively. Here, the processor 670 may set spatial features of objects based on an input of a creator through a graphic interface. For example, the processor 670 may output the graphic interface for the creator. For example, the processor 670 may output the graphic interface to an external device through the communication module 620. As another example, the processor 670 may output the graphic interface through the display module 640. The processor 670 may set spatial features for objects, respectively, based on an input of at least one creator through the graphic interface. For example, the processor 670 may receive an input of the creator from the external device through the communication module 620. As another example, the processor 670 may detect the input of the creator through the input module 630.

For example, referring to FIG. 4A or 4B, the processor 670 may set spatial features of objects based on the input of the creator through the graphic interface. The processor 670 may select each of the objects at a specific venue, and may set at least one of the spatial features, that is, position information, group information, and environment information in association with the objects. Here, the processor 670 may set a position of each object based on the input of the creator and may fine-tune at least one of a position and an audio effect for each object. Here, the audio effect may represent a positional relationship between an object and a listener in a corresponding space. For example, the audio effect may include azimuth, elevation, distance, BES, gain, etc., of a position of an object relative to a position of a listener. Herein, although the position of the object is represented through azimuth, elevation, and distance, a scheme capable of representing the position of the object is not limited to a specific coordinate system. Through this, the processor 670 may set a spatial feature of a corresponding object based on a position and an audio effect of the object.

Although it is described above that operation 730 is performed after performing operations 710 and 720, it is provided as an example only. That is, operations 710 and 720 may be performed after performing operation 730.

In operation 740, the electronic device 310 may generate metadata based on the spatial features of the objects. Here, the processor 670 may generate presets (or alternatively, desired sets) selectable by the electronic device 150 by combining the spatial features of the objects. For example, the processor 670 may generate presets by combining environment information about a specific venue, position information of specific objects, and audio effects. Here, each of the presets may also be referred to as audio scene information. For example, each of the presets may represent an audio scene when a position of the user corresponds to the center of a stage, an audio scene when the position of the user corresponds to audience seat row 1, an audio scene with an emphasis on vocalists, an audio scene with an emphasis on musical instruments, an audio scene with an emphasis on field sound, an audio scene with a dynamically moving stringed instrument, and the like.

In operation 750, the electronic device 310 may transmit the audio files and the metadata. The processor 670 may transmit the audio files and the metadata to the server 330 through the communication module 620. Here, the processor 670 may transmit the audio files and the metadata using a first communication protocol, for example, an RTMP.

Figure 8:
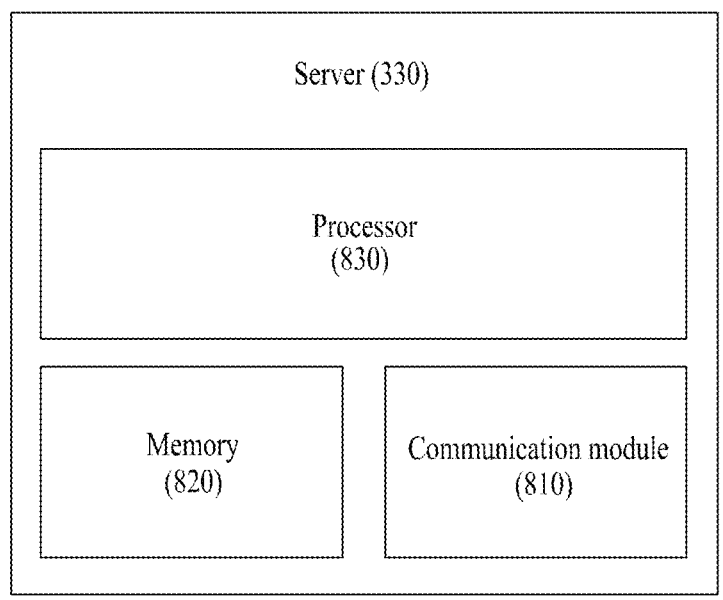
FIG. 8 is a diagram illustrating an example of an internal configuration of a server according to at least one example embodiment.

FIG. 8 is a diagram illustrating an example of an internal configuration of the server 330 according to at least one example embodiment.

Referring to FIG. 8, the server 330 may include at least one of a communication module 810, a memory 820, and a processor 830. In some example embodiments, at least one of components of the server 330 may be omitted and at least one another component may be added. In some example embodiments, at least two components among the components of the server 330 may be implemented as a single integrated circuitry.

The communication module 810 may communicate with an external device in the server 330. The communication module 810 may establish a communication channel between the server 330 and the external device and may communicate with the external device through the communication channel. For example, the external device may include at least one of the electronic device (production studio) 310 and the electronic device 150. The communication module 810 may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, WiFi direct, and IrDA. The far field communication module may communicate with the external device using a far field communication scheme. Here, the far field communication module may communicate with the external device through a network. For example, the network may include at least one of a cellular network, the Internet, and a computer network such as a local area network (LAN) and a wide area network (WAN).

The memory 820 may store a variety of data used by at least one component of the server 330. For example, the memory 820 may include at least one of a volatile memory and a non-volatile memory. The data may include at least one program and input data or output data related thereto. The program may be stored in the memory 820 as software including at least one instruction.

The processor 830 may control at least one component of the server 330 by executing the program of the memory 820. Through this, the processor 830 may perform data processing or operation. Here, the processor 830 may execute the instruction stored in the memory 820. The processor 830 may receive audio files and metadata for objects at a specific venue from the electronic device 310 through the communication module 810. Here, the processor 830 may receive the audio files and the metadata using a first communication protocol, for example, an RTMP. The processor 830 may transmit audio files and metadata for objects at a specific venue to the electronic device 150 through the communication module 810. Here, the processor 830 may transmit the audio files and the metadata using a second communication protocol, for example, an HTTP live streaming (HLS).

Figure 9:
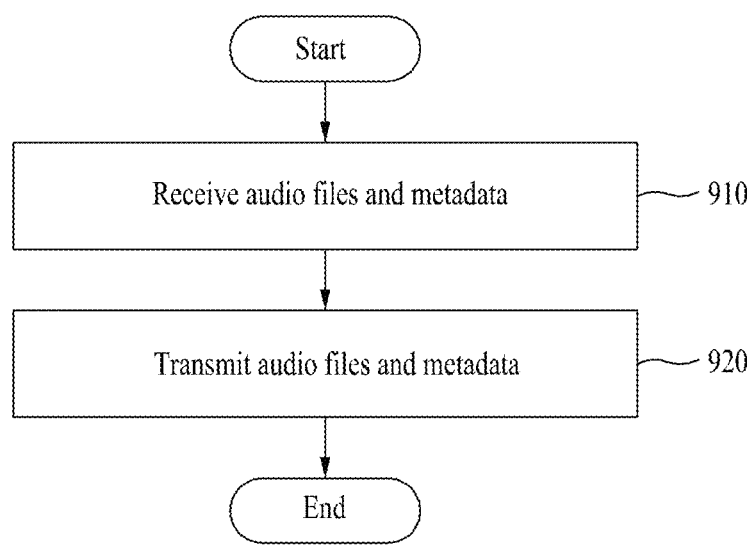
FIG. 9 is a flowchart illustrating an example of an operation procedure of a server according to at least one example embodiment.

FIG. 9 is a flowchart illustrating an example of an operation procedure of the server 330 according to at least one example embodiment.

Referring to FIG. 9, in operation 910, the server 330 may receive audio files and metadata. The processor 830 may receive audio files and metadata for objects at a specific venue from the electronic device 310 through the communication module 810. Here, the processor 830 may receive the audio files and the metadata using a first communication protocol, for example, an RTMP.

In operation 920, the server 330 may transmit the audio files and the metadata. The processor 830 may transmit the audio files and the metadata for the objects at the venue to the electronic device 150 through the communication module 810. Here, the processor 830 may transmit the audio files and the metadata using a second communication protocol, for example, an HLS.

In some example embodiments, the server 330 may transmit a pre-rendered signal in a format playable by the electronic device 150. For example, when the electronic device 150 is incapable of rendering audio files based on metadata, the server 330 may transmit the pre-rendered signal for the electronic device 150. The playable format may include one of a headphone, a stereo speaker, a multichannel speaker, and a sound bar. Referring to FIG. 4C, in the case of providing a function that allows the user to select a preset in real time, pre-rendering may be performed for each preset.

Figure 10:
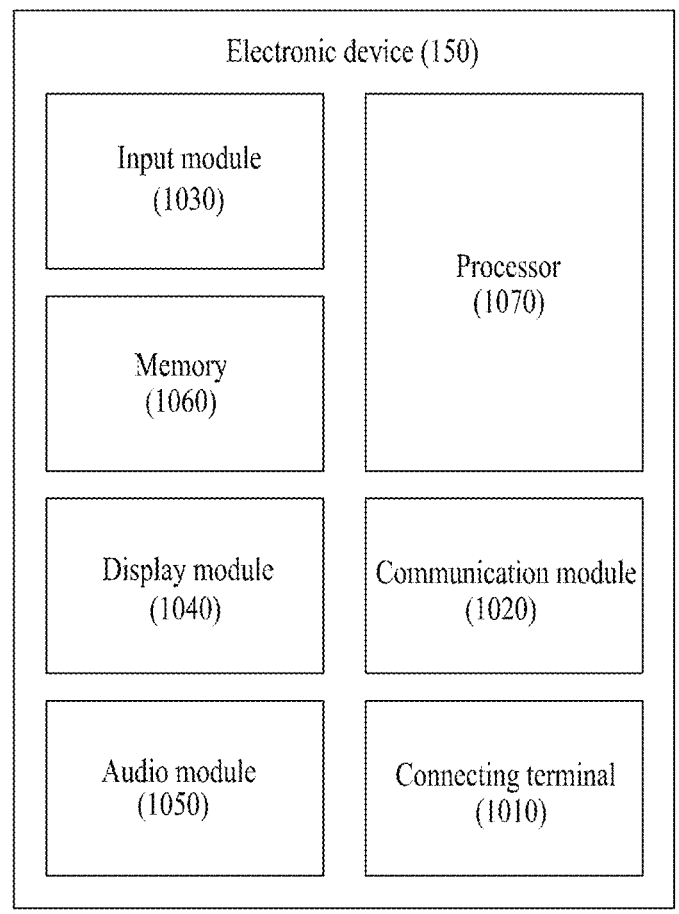
FIG. 10 is a diagram illustrating an example of an internal configuration of an electronic device according to at least one example embodiment.

FIG. 10 is a diagram illustrating an example of an internal configuration of the electronic device 150 according to at least one example embodiment.

Referring to FIG. 10, the electronic device 150 may include at least one of a connecting terminal 1010, a communication module 1020, an input module 1030, a display module 1040, an audio module 1050, a memory 1060, and a processor 1070. In some example embodiments, at least one of components of the electronic device 150 may be omitted and at least one another component may be added. In some example embodiments, at least two components among components of the electronic device 150 may be implemented as a single integrated circuitry.

The connecting terminal 1010 may be physically connected to an external device in the electronic device 150. For example, the external device may include another electronic device. To this end, the connecting terminal 1010 may include at least one connector. For example, the connector may include at least one of an HDMI connector, a USB connector, an SD card connector, and an audio connector.

The communication module 1020 may communicate with the external device in the electronic device 150. The communication module 1020 may establish a communication channel between the electronic device 150 and the external device and may communicate with the external device through the communication channel. For example, the external device may include at least one of the electronic device 310 and the server 330. The communication module 1020 may include at least one of a wired communication module and a wireless communication module. The wired communication module may be connected to the external device in a wired manner through connecting terminal 1010 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, WiFi direct, and IrDA. The far field communication module may communicate with the external device using a far field communication scheme. Here, the far field communication module may communicate with the external device through a network. For example, the network may include at least one of a cellular network, the Internet, and a computer network such as a LAN and a WAN.

The input module 1030 may input a signal to be used for at least one component of the electronic device 150. The input module 1030 may include at least one of an input device configured for the user to directly input a signal to the electronic device 150, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of a head tracking sensor, a head-mounted display (HMD) controller, a touch circuitry configured to detect a touch, and a sensor circuitry configured to measure strength of force occurring due to the touch.

The display module 1040 may visually display information. For example, the display module 1040 may include at least one of a display, an HMD, a hologram device, and a projector. For example, the display module 1040 may be configured as a touchscreen through assembly to at least one of the sensor circuitry and the touch circuitry of the input module 1030.

The audio module 1050 may auditorily play back information. For example, the audio module 1050 may include at least one of a speaker, a receiver, an earphone, and a headphone.

The memory 1060 may store a variety of data used by at least one component of the electronic device 150. For example, the memory 1060 may include at least one of a volatile memory and a non-volatile memory. Data may include at least one program and input data or output data related thereto. The program may be stored in the memory 1060 as software including at least one instruction and, for example, may include at least one of an operating system (OS), middleware, and an application.

The processor 1070 may control at least one component of the electronic device 150 by executing the program of the memory 1060. Through this, the processor 1070 may perform data processing or operation. Here, the processor 1070 may execute an instruction stored in the memory 1060. The processor 1070 may play back content provided from the computer system 110. The processor 1070 may play back video content through the display module 1040 or may play back at least one of plain audio content and immersive audio content through the audio module 1050.

The processor 1070 may receive audio files and metadata for objects at a specific venue from the server 330 through the communication module 1020. Here, the processor 1070 may receive the audio files and the metadata using a second communication protocol, for example, an HLS. The processor 1070 may render the audio files based on the metadata. Through this, the processor 1070 may render the audio files based on spatial features of the objects in the metadata.

Figure 11:
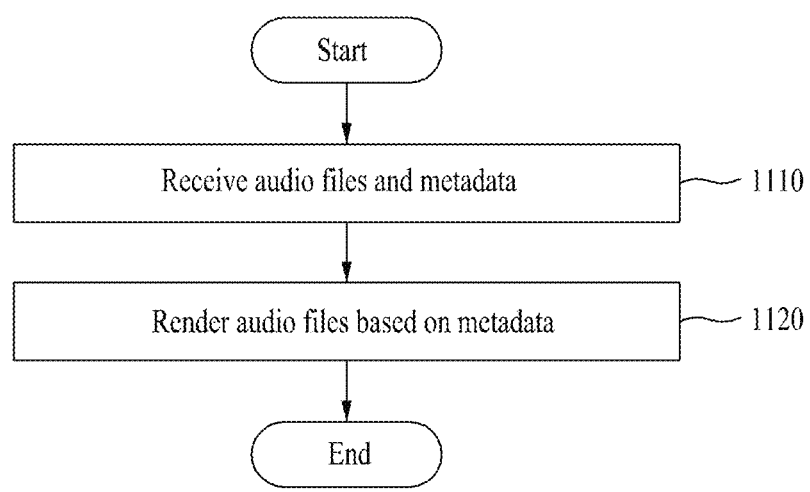
FIG. 11 is a flowchart illustrating an example of an operation procedure of an electronic device according to at least one example embodiment.

FIG. 11 is a flowchart illustrating an example of an operation procedure of the electronic device 150 according to at least one example embodiment.

Referring to FIG. 11, in operation 1110, the electronic device 150 may receive audio files and metadata. The processor 1070 may receive audio files and metadata for objects at a specific venue from the server 330 through the communication module 1020. Here, the processor 1070 may receive the audio files and the metadata using a second communication protocol, for example, an HLS.

In operation 1120, the electronic device 150 may select at least one object from among the objects based on the metadata. Here, the processor 1070 may select at least one object from among the objects based on an input of a user through a user interface. For example, the processor 1070 may output the user interface for the user. For example, the processor 1070 may output the user interface to an external device through the communication module 1020. As another example, the processor 1070 may output the user interface through the display module 1040. The processor 1070 may select at least one object from among the objects based on an input of at least one user through the user interface.

In operation 1120, the electronic device 150 may render the audio files based on the metadata. The processor 1070 may render the audio files based on spatial features of the objects in the metadata. For example, referring to FIG. 4C, the processor 1070 may select a single preset from among presets based on the input of the user through the user interface (UI). That is, the processor 1070 may display a plurality of presets and may select a single preset from among the presets based on the input of the user. Therefore, the processor 1070 may render the audio files using the spatial features of objects based on the selected preset. The processor 1070 may play back final audio signals through the audio module 1050 by applying the spatial features of the objects to the audio files of the objects. For example, the electronic device 150 may extract first preset information and second preset information and may perform switching from the first preset information to the second preset information at a point of reducing or minimizing a sound quality distortion by referring to a look-up table including an index of sound quality distortion occurring when switching from the first preset information to the second preset information over time. Here, the look-up table may be generated by at least one of the electronic device 310, the server 330, and the electronic device 150. Through this, the electronic device 150 may realize a user-customized being-there for a corresponding venue.

Accordingly, the user of the electronic device 150 may feel the user-customized being-there as if the user directly listens to audio signals generated from corresponding objects at a venue in which the objects are disposed.

According to some example embodiments, it is possible to propose stereophonic sound implementation technology for realizing a user-customized being-there in association with audio. Here, the computer system 110 may generate audio files for a plurality of objects at a specific venue, respectively. The computer system 110 may generate metadata including spatial features at the venue for the objects. Here, the computer system 110 may generate the spatial features for the objects, respectively, based on settings of a creator. Through this, the electronic device 150 may reproduce user-customized audio content instead of simply playing back completed audio content. That is, the electronic device 150 may implement stereophonic sound by rendering the audio files based on the spatial features in the metadata. That is, the electronic device 150 may realize the user-customized being-there in association with audio by using the audio files and the metadata as materials. Therefore, a user of the electronic device 150 may feel the user-customized being-there, as if the user directly listens to audio signals generated from specific objects at a specific venue.

A method by the computer system 110 according to some example embodiments may include generating audio files based on audio signals respectively generated from a plurality of objects at a venue (operation 520, 720), generating metadata including spatial features at the venue that are respectively set for the objects (operation 530, 740), and transmitting the audio files and the metadata for the objects to the electronic device 150 (operation 540, 550, 750).

According to some example embodiments, the electronic device 150 may realize a being-there at the venue by rendering the audio files based on the spatial features in the metadata.

According to some example embodiments, the generating of the audio files (operation 520, 720) may include obtaining audio signals through a microphone attached to each of the objects or installed to be adjacent to each of the objects (operation 510, 710) and generating the audio files from the audio signals, respectively (operation 520, 720).

According to some example embodiments, the generating of the metadata (operation 530, 740) may include outputting a graphic interface, setting the spatial features for the objects, respectively, based on at least one input through the graphic interface (operation 730), and generating the metadata based on the spatial features (operation 740).

According to some example embodiments, the metadata may include at least one of position information about each of the objects, group information representing a position combination of at least two objects among the objects and environment information about the venue.

According to some example embodiments, each of the objects may include one of a musical instrument, an instrument player, a vocalist, a talker, a speaker, and a background.

According to some example embodiments, the metadata may include a plurality of pieces of audio scene information.

That is, the metadata may include a variety of audio scene information, for example, an audio scene when a position of the user corresponds to the center of a stage, an audio scene when the position of the user corresponds to audience seat row 1, an audio scene with an emphasis on vocalists, an audio scene with an emphasis on musical instruments, an audio scene with an emphasis on field sound, an audio scene with a dynamically moving stringed instrument, and the like.

According to some example embodiments, a plurality of audio scenes may be provided in a preset form selectable by the user in real time, as illustrated in FIG. 4C.

According to some example embodiments, the audio files and the metadata may be generated using a production tool by the electronic device 310 having the production tool. The metadata may be generated in a preset form selectable by the electronic device 150.

According to some example embodiments, the transmitting of the audio files and the metadata to the electronic device 150 (operation 540, 550, 750) may include receiving, by the server 330, the audio files and the metadata from the electronic device 310 based on a first communication protocol (operation 910) and transmitting, by the server 330, the audio files and the metadata to the electronic device 150 based on a second communication protocol (operation 550, 920).

According to some example embodiments, the server 330 may transmit a pre-rendered signal in a format playable by the electronic device 150 to support the electronic device 150 incapable of rendering the audio files based on the metadata (operation 560). The playable format may include one of a headphone, a stereo speaker, a multichannel speaker, and a sound bar. Referring to FIG. 4C, in the case of providing a function that allows the user to select a preset in real time, pre-rendering may be performed for each preset. According to example embodiments, the server 330 may be a live streaming server.

According to some example embodiments, the electronic device 150 may realize a being-there at a venue by receiving the audio files and the metadata, by extracting preset information from the metadata, and by rendering the audio files according to the preset information based on at least one input through a user interface.

According to some example embodiments, referring to FIG. 4C, the electronic device 150 may allow the user to select a preset (sound scene) in real time. In the case of switching a preset, the preset may be switched at a point of reducing or minimizing a sound quality distortion that is not at a point selected by the user. The look-up table may be referred to for a switching point of reducing or minimizing the sound quality distortion. The look-up table includes an index of sound quality distortion over time. The look-up table may be generated by at least one of the electronic device (production studio) 310, the server 330, and the electronic device 150.

The computer system 110 according to some example embodiments may include the electronic device 310 configured to generate audio files, respectively, based on audio signals respectively generated from a plurality of objects at a venue, and to generate metadata including spatial features at the venue that are respectively set for the objects, and the server 330 configured to transmit the audio files and the metadata about the objects to the electronic device 150.

According to some example embodiments, the electronic device 150 may realize a being-there at the venue by rendering the audio files based on spatial features in the metadata.

According to some example embodiments, the electronic device 310 may be configured to obtain the audio signals through a microphone attached to each of the objects or installed to be adjacent to each of the objects, and to generate the audio files from the audio signals, respectively.

According to some example embodiments, the electronic device 310 may be configured to output a graphic interface, to set the spatial features for the objects, respectively, based on at least one input through the graphic interface, and to generate the metadata based on the spatial features. According to some example embodiments, the metadata may include at least one of position information about each of the objects, group information representing a position combination of at least two objects among the objects and environment information about the venue.

According to some example embodiments, each of the objects may include one of a musical instrument, an instrument player, a vocalist, a talker, a speaker, and a background.

According to some example embodiments, the electronic device 310 may include a production tool and may be configured to generate the audio files and the metadata using the production too, and to generate the metadata in a preset form selectable by the electronic device 150.

According to some example embodiments, the server 330 may be configured to receive the audio files and the metadata from the electronic device 310 based on a first communication protocol, and to transmit the audio files and the metadata to the electronic device 150 based on a second communication protocol.

According to some example embodiments, the server 330 may be a live streaming server.

According to some example embodiments, the electronic device 150 may be configured to realize the being-there at the venue by receiving the audio files and the metadata, by extracting preset information from the metadata, and by rendering the audio files based on the preset information and at least one input through a user interface.

According to some example embodiments, the electronic device 150 may be configured to extract first preset information and second preset information, and to perform switching from the first preset information to the second preset information at a point of reducing or minimizing a sound quality distortion by referring to a look-up table including an index of sound quality distortion occurring when switching from the first preset information to the second preset information over time.

The apparatuses described herein may be implemented using hardware components, and/or a combination of hardware components and software components. For example, a processing device (e.g., processor) and components (e.g., various modules) described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable media including program instructions to implement various operations embodied by a computer. Here, the media may continuously store programs executable by a computer or may temporally store the same for execution or download. The media may be various record devices or storage devices in a form in which one or a plurality of hardware components is coupled and may be distributed in a network. Examples of the media include magnetic media such as hard disks, floppy disks, and magnetic tape, optical media such as CD ROM disks and DVD, magneto-optical media such as floptical disks, and hardware devices that are specially configured to store program instructions, such as read-only memory (ROM), random access memory (RAM), flash memory, and the like. Examples of other media may include recording media and storage media managed by an app store that distributes applications or a venue, a server, and the like that supplies and distributes other various types of software.

Some example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware or a combination of hardware and software (e.g., firmware), and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to some example embodiments, each component (e.g., module or program) of the aforementioned components may include a singular entity or a plurality of entities. According to some example embodiments, at least one component among the aforementioned components or operations may be omitted, or at least one another component or operation may be added. Alternatively or additionally, the plurality of components (e.g., module or program) may be integrated into a single component. In this case, the integrated component may perform the same or similar functionality as being performed by a corresponding component among a plurality of components before integrating at least one function of each component of the plurality of components. According to some example embodiments, operations performed by a module, a program, or another component may be performed in parallel, repeatedly, or heuristically, or at least one of the operations may be performed in different order or omitted. Further, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method by a computer system, the method comprising:
   generating audio files based on respective audio signals, the audio signals having been respectively generated from a plurality of objects at a venue;
   generating metadata including spatial features at the venue that are respectively set for the objects; and
   transmitting the audio files and the metadata for the objects to a first electronic device to cause the first electronic device to realize a being-there at the venue by rendering the audio files based on the spatial features in the metadata,
   wherein the metadata includes at least one of position information about each of the objects, group information representing a position combination of at least two objects among the objects, and environment information about the venue.

2. The method of claim 1, wherein the generating audio files comprises:
   obtaining the audio signals through a microphone attached to each of the objects or installed adjacent to each of the objects; and
   generating the audio files from the audio signals, respectively.

3. The method of claim 1, wherein the generating metadata comprises:
   outputting a graphic interface;
   setting the spatial features for the objects, respectively, based on at least one input through the graphic interface; and
   generating the metadata based on the spatial features.

4. The method of claim 1, wherein each of the objects includes one of a musical instrument, an instrument player, a vocalist, a talker, a speaker, and a background.

5. The method of claim 1, wherein the transmitting causes the first electronic device to be configured such that the being-there at the venue is realized by receiving the audio files and the metadata, by extracting desired information from the metadata, and by rendering the audio files based on the desired information and at least one input through a user interface.

6. The method of claim 5, wherein the transmitting causes the first electronic device to extract the desired information including first information and second information, and perform switching from the first information to the second information at a point of reducing or minimizing a sound quality distortion by referring to a look-up table including an index of sound quality distortion occurring in connection with the switching from the first information to the second information over time.

7. A method by a computer system, the method comprising:
  generating audio files based on respective audio signals, the audio signals having been respectively generated from a plurality of objects at a venue;
  generating metadata including spatial features at the venue that are respectively set for the objects; and
  transmitting the audio files and the metadata for the objects to a first electronic device to cause the first electronic device to realize a being-there at the venue by rendering the audio files based on the spatial features in the metadata, wherein
  the generating audio files and the generating metadata are performed using a production tool included in a second electronic device that is included in the computer system, and
  the generating metadata generates the metadata in a form selectable by the first electronic device.

8. The method of claim 7, wherein the transmitting the audio files and the metadata comprises:
  receiving, by a server, the audio files and the metadata from the second electronic device included in the computer system based on a first communication protocol; and
  transmitting, by the server, the audio files and the metadata to the first electronic device based on a second communication protocol.

9. The method of claim 8, wherein the server is a live streaming server.

10. A non-transitory computer-readable record medium storing a program, which when executed by at least one processor included in a computer system, causes the computer system to perform the method of claim 1.

11. A computer system comprising:
  a first electronic device included in the computer system and configured to,
  generate audio files based on respective audio signals, the audio signals respectively generated from a plurality of objects at a venue, and
  generate metadata including spatial features at the venue that are respectively set for the objects; and
  a server configured to transmit the audio files and the metadata for the objects to a second electronic device to cause the second electronic device to realize a being-there at the venue by rendering the audio files based on the spatial features in the metadata,
  wherein the metadata includes at least one of position information about each of the objects, group information representing a position combination of at least two objects among the objects, and environment information about the venue.

12. The computer system of claim 11, wherein the first electronic device is configured to obtain the audio signals through a microphone attached to each of the objects or installed adjacent to each of the objects, and generate the audio files from the audio signals, respectively.

13. The computer system of claim 11, wherein the first electronic device is configured to output a graphic interface, to set the spatial features for the objects, respectively, based on at least one input through the graphic interface, and generate the metadata based on the spatial features.

14. The computer system of claim 11, wherein each of the objects includes one of a musical instrument, an instrument player, a vocalist, a talker, a speaker, and a background.

15. The computer system of claim 11, wherein the first electronic device includes a production tool and is configured to generate the audio files and the metadata using the production tool, and generate the metadata in a form selectable by the first electronic device.

16. The computer system of claim 11, wherein the server is configured to receive the audio files and the metadata from the first electronic device based on a first communication protocol, and transmit the audio files and the metadata to the second electronic device based on a second communication protocol.

17. The computer system of claim 11, wherein the server is configured to transmit the audio files and the metadata for the objects to the second electronic device to cause the second electronic device to realize the being-there at the venue by receiving the audio files and the metadata, by extracting desired information from the metadata, and by rendering the audio files based on the desired information and at least one input through a user interface.

18. The computer system of claim 17, wherein the server is configured to transmit the audio files and the metadata for the objects to the second electronic device to cause the second electronic device is configured to extract the desired information including first information and second information, and perform switching from the first information to the second information at a point of reducing or minimizing a sound quality distortion by referring to a look-up table including an index of sound quality distortion occurring in connection with the switching from the first information to the second information over time.

* * * * *